United States Patent [19]

Roger et al.

[11] 4,380,713
[45] Apr. 19, 1983

[54] DOVETAILED TEETH FOR USE IN A SYSTEM FOR FIXING STATOR WINDING BARS IN A ROTATING ELECTRIC MACHINE

[75] Inventors: Gillet Roger; Nithart Henri, both of Belfort, France

[73] Assignees: Alsthom-Atlantique; Electricite de France, both of Paris, France

[21] Appl. No.: 290,449

[22] Filed: Aug. 6, 1981

[30] Foreign Application Priority Data

Aug. 7, 1980 [FR] France .................................. 80 17444

[51] Int. Cl.³ ............................................ H02K 3/48
[52] U.S. Cl. ...................................... 310/214; 310/43; 310/45; 310/258; 310/271; 336/197; 29/596
[58] Field of Search ................... 336/197, 210; 29/596; 310/214, 45, 215, 194, 254, 255, 91, 257–259, 216–218, 43, 178, 208, 271

[56] References Cited

U.S. PATENT DOCUMENTS

| | | | |
|---|---|---|---|
| 1,756,672 | 4/1930 | Barr | 310/250 |
| 3,405,297 | 10/1968 | Madsen | 310/258 |
| 3,437,858 | 4/1968 | White | 310/214 |
| 3,560,776 | 2/1971 | Kildishev et al. | 310/214 |
| 3,777,197 | 12/1973 | Preston et al. | 310/254 |
| 4,137,471 | 1/1979 | Sato et al. | 310/43 |
| 4,228,375 | 10/1980 | Beermann et al. | 310/214 |
| 4,278,905 | 6/1981 | Chari et al. | 310/214 |

FOREIGN PATENT DOCUMENTS

| | | | |
|---|---|---|---|
| 2627802 | 12/1977 | Fed. Rep. of Germany | 310/214 |
| 1464588 | 11/1966 | France | 310/214 |
| 2167690 | 8/1973 | France | 310/214 |
| 2268380 | 11/1975 | France | 310/214 |
| 2287798 | 5/1976 | France | 310/214 |
| 2331184 | 11/1976 | France | 310/214 |
| 2320653 | of 1977 | France | 310/214 |
| 2324145 | 4/1977 | France | 310/214 |
| 2627802 | 12/1977 | France | 310/214 |
| 2371808 | 6/1978 | France | 310/214 |
| 2432792 | 2/1980 | France | 310/214 |

*Primary Examiner*—R. Skudy
*Attorney, Agent, or Firm*—Sughrue, Mion, Zinn, Macpeak and Seas

[57] ABSTRACT

The winding bars (12) are fixed to the body (20) of teeth (14, 16) whose feet (18) form a dovetail engaged in the stator magnetic circuit (2), the mechanical strength of these teeth being due to the fact that they are constituted by layers of sheathing fabric coated with resin completely wrapped about the foot, body and head of the core of each of the teeth and forming a casing (46). Wedges (28) are driven in radially on the side walls of the teeth whose thickness is substantially constant around a core (40) whose form defines that of the tooth.

6 Claims, 6 Drawing Figures

DOVETAILED TEETH FOR USE IN A SYSTEM FOR FIXING STATOR WINDING BARS IN A ROTATING ELECTRIC MACHINE

The present invention relates to dovetailed teeth for use in a system for fixing stator winding bars of a rotating electric machine whose stator is of the type herein referred to as "slotless".

BACKGROUND OF THE INVENTION

A "slotless" stator winding has bars which, instead of being wedged in the bottoms of slots formed in the magnetic circuit of the stator, are applied against the cylindrical inner surface thereof.

The system by which the bars are fixed requires some form of fixing means for fixing the bars to the stator magnetic circuit. Various fixing means e.g. screws or dovetail joints have been used. They engage the magnetic circuit and pull the bars radially outwards until they press against the inner surface of the magnetic circuit. Since the fixing means penetrate into the magnetic circuit to obtain a radial purchase thereon, the same fixing system can be used simultaneously to prevent the winding bars from moving tangentially, i.e. to prevent their angular positions from varying.

Known fixing systems for fixing bars to the magnetic circuit suffer from disadvantages such as:

They are not very compact because they use insulating screws whose poor mechanical characteristics require them to be of large dimensions.

Metal laminations are used in the rotor-stator air gap. These laminations constitute protruding bar-fixing teeth whose bases are dovetailed into the stator magnetic circuit. The metal laminations are not magnetic and provide good mechanical strength to the fixing teeth but they suffer losses by the Joule effect because of the high and variable magnetic inductions (see FIG. 8 of U.S. Pat. No. 3,405,297 in the name of Madsen).

The greater the number of wedges to be driven in radially, tangentially or longitudinally in known devices to make the bars both tangentially and radially motionless relative to the teeth, the longer and more expensive both assembly and disassembly.

The present invention aims to provide dovetailed teeth for use in a system for fixing stator winding bars of an electric rotating machine while avoiding the use of metal in the rotor-stator air gap.

SUMMARY OF THE INVENTION

The present invention provides a dovetailed tooth for use in fixing stator winding bars of an electric rotating machine having a rotor that rotates about a "longitudinal" axis inside a stator, the stator having a magnetic circuit with a cylindrical inner surface disposed around the rotor and carrying angularly spaced winding bars that extend longitudinally and that are fixed against said cylindrical inner surface by means of said dovetailed teeth which are fixed to said magnetic circuit, said teeth protruding radially inwards and being spaced out angularly, each of said teeth being generally prismatic with longitudinal generatrices and including:

a foot whose cross-section with a generally trapezoidal shape having a large base and a small base both disposed in the "tangential" direction with the small base nearest the inside of the machine, two flanks connecting said bases together; and a body which extends in the "radial" direction from the small base of said trapezium;

the teeth being fixed by engaging their feet in longitudinal slots of a cross-section which corresponds to that of said feet, said slots being formed in the inner surface of said stator magnetic circuit;

the winding bars being fixed to the stator magnetic circuit by means of the bodies of these teeth which extend radially inwards from the inner surface of the stator magnetic circuit;

the improvement wherein each dovetailed tooth comprises: a core which extends along the whole length of the tooth, part of said core being disposed inside said foot of said tooth and having a base surface which is parallel to and faces a middle portion of the large base of the foot and two flank surfaces which extend towards the body of the tooth from the side edges of this base surface while coming progressively closer to each other; and a covering applied against said core, the thickness of the covering being substantially constant and forming at least the large base and the two flanks of the foot and the side walls of the body of the tooth, this covering being constituted by superposed layers of a sheathing fabric disposed parallel to the longitudinal direction and following the side surfaces of the tooth, these layers being impregnated with a hard resin so that the foot has high resistance to radial inward traction forces and so that each tooth as a whole has high resistance to bending forces about longitudinal axes, the greater part of the tension and bending forces being borne by the covering.

BRIEF DESCRIPTION OF THE DRAWINGS

With reference to the attached diagrammatic figures, a description is given hereinafter by way of a non-limiting example of how the invention can be put into effect. It must be understood that without going beyond the scope of the invention, the components described and illustrated can be replaced by other components which perform the same technical functions. When the same component is illustrated in several figures, it bears the same reference symbol therein.

FIG. 2 is a perspective view of a long tooth of the system of FIG. 1, with two blocking wedges which are longitudinally driven in.

DESCRIPTION OF PREFERRED EMBODIMENT

Figure 1:
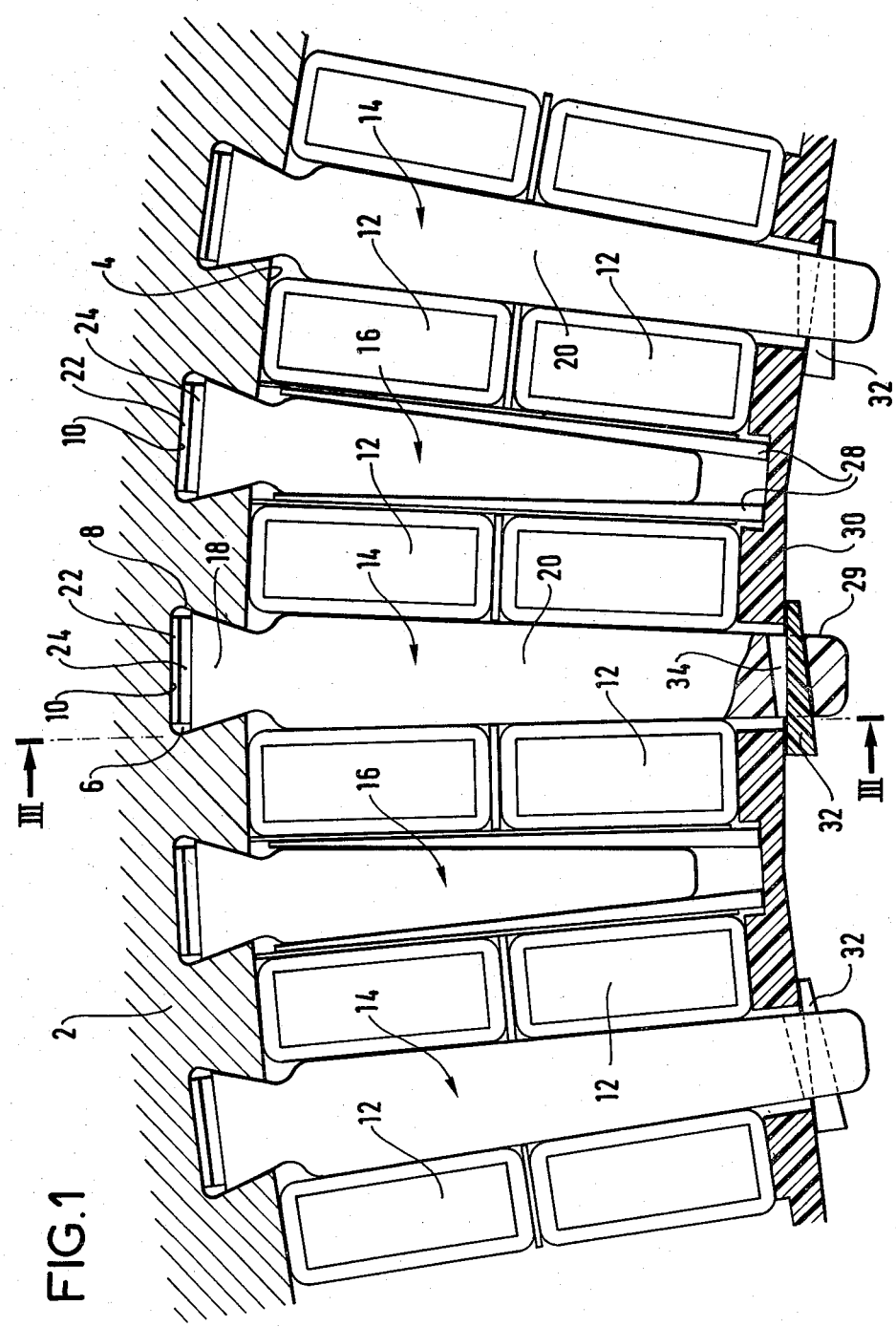
FIG. 1 is a diagrammatic partial view of a system in accordance with the invention, showing a cross-section through a plane perpendicular to the axis of the machine.

The system which is described hereinafter is installed on the magnetic circuit 2 of the stator of a power alternator whose rotor rotates about an axis which is not shown in the figures and is perpendicular to the plane of FIG. 1. This axis is that of the machine and also that of the inside surface 4 of the magnetic circuit, which surface is cylindrical. The "longitudinal" direction, is defined as being parallel to the axis. The "radial" direction is defined as being at right-angles to the axis. The "tangential" direction is defined at any given point as being perpendicular both to the axis and to the radial direction passing through said given point.

The stator magnetic circuit 2 is conventionally constituted by magnetic steel laminations extending perpendicular to the axis and stacked longitudinally.

Longitudinal slots 6 of trapezoidal cross-section with the small base of each trapezium coinciding substantially with the inner surface 4 of the magnetic circuit are in the inner surface. These slots are spaced out angularly and uniformly. Each of them has two side surfaces 8 and a bottom 10. They enable conventional connection to be made by dovetail joints.

Winding bars 12 are disposed longitudinally and are fixed to and bear against the surface in each gap between a pair of slots 6. They are held by means of the fixing system which will now be described.

The system includes fixing teeth such as 14 or 16 fixed in the slots 6 by longitudinally engaging them from one end of a magnetic circuit. Each of the teeth has a generally prismatic shape with longitudinal generator lines and has:

a foot 18 whose cross-section is generally trapezoidal with its large base and its small base disposed in the "tangential" direction and two sides which connect these bases together; and a body 20 which extends in the "radial" direction from the small base of the trapezium.

Figure 2:
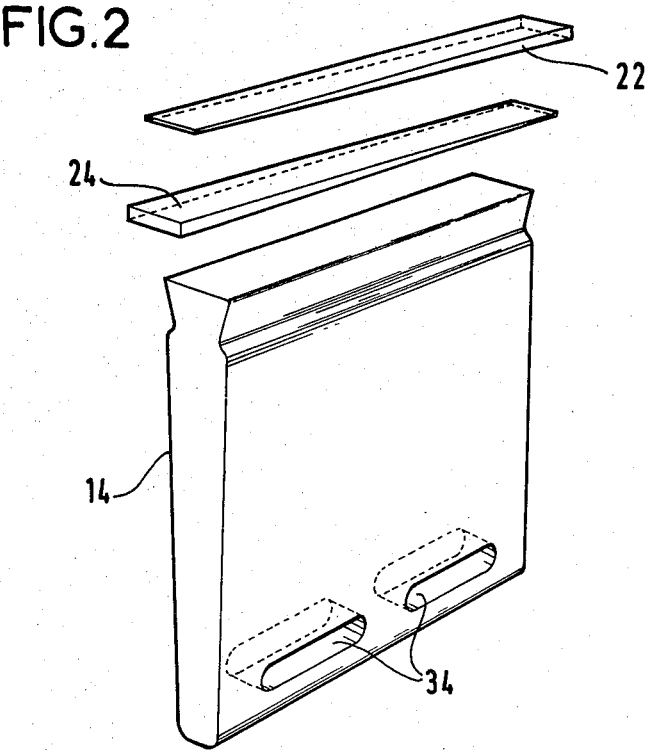

These teeth are fixed by engaging their feet 18 in the slots 6. The bodies of the teeth protrude radially inwards from the inside surface 4 of the magnetic circuit. The teeth are provided with radial wedges 22 and 24 which are longitudinally driven in and which are disposed between the large bases of the feet 18 of the teeth 14 and the bottoms 10 of the slots 6 in which the feet are engaged, to push the feet radially inwards and thus to keep the feet tangentially compressed by pressing them permanently against the side surfaces of the slots. There are two such wedges per tooth so as to provide uniform radial pressure, namely, an outer wedge 22 which cooperates with an inner wedge 24 (see FIG. 2).

Figure 3:
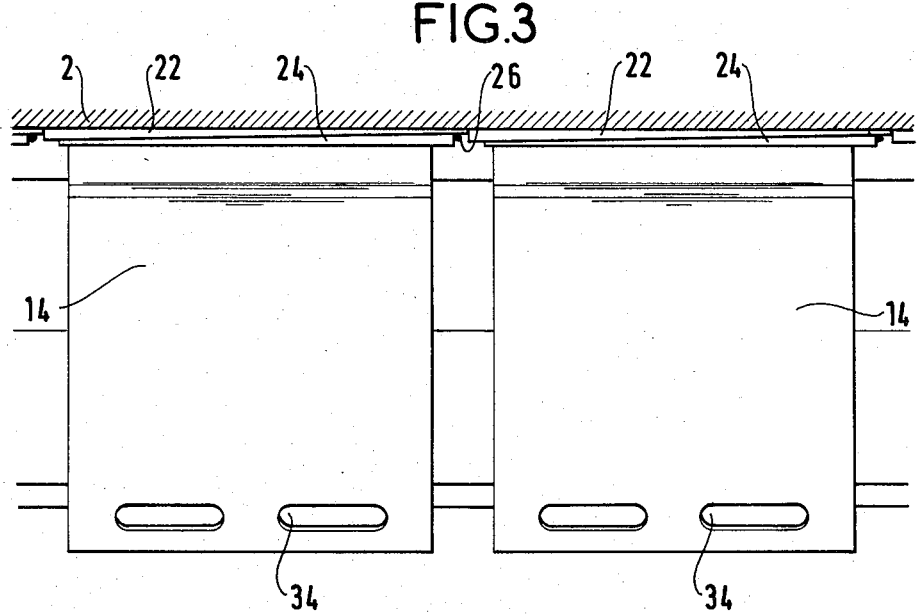
FIG. 3 is a partial side view along a line III—III of FIG. 1 of two longitudinally successive long teeth, the plane of this figure is parallel to the axis of the machine.
Figure 4:
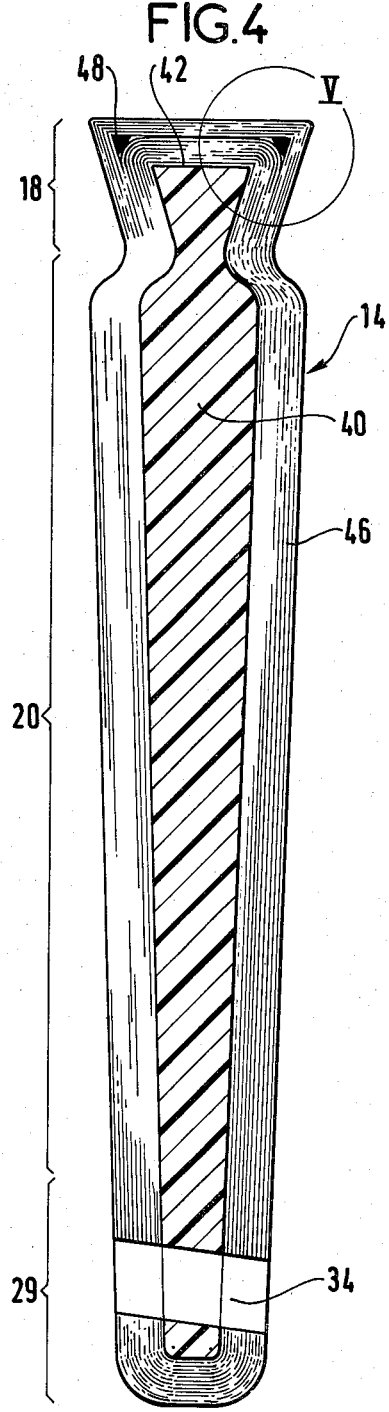
FIG. 4 is a cross-section through a long tooth of the system, the section plane is perpendicular to the axis of the machine.
Figure 5:
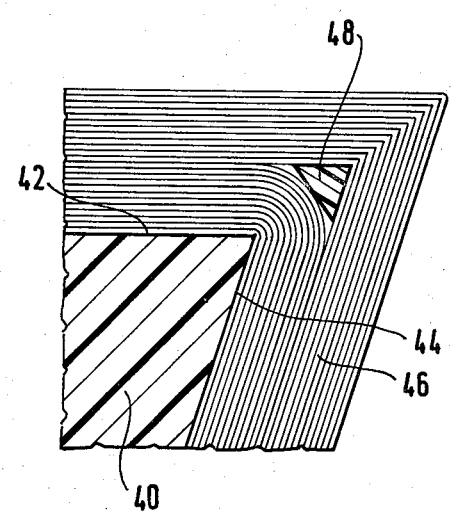
FIG. 5 illustrates a detail V of FIG. 4.

As shown in FIG. 3, a gap is provided between a pair of teeth which succeed each other longitudinally with their feet engaged in the same longitudinal slot, so as to allow the wedges to be driven in without removing the teeth. The outer wedges 22 are longer than the inner wedges 24 and follow one another longitudinally without gaps in between, while the short inner wedges 24 are locked in place by small quantities of adhesive 26 after wedging.

The internal constitution of the teeth is described further on. It uses electrically insulating materials which prevent electric losses while ensuring that the teeth are very rigid and strong enough mechanically.

Successive fixing teeth in the circumferential direction are alternately a long tooth 14 and a short tooth 16. Only the long teeth have heads 29 which protrude inwardly beyond the winding bars.

The bars 12 are wedged tangentially by wedges 28 urged radially outwardly and inserted between the winding bars 12 and the sides of the short teeth 16, the short teeth being narrower than the long teeth in the tangential direction to accommodate said wedges.

The radial wedges 28 are held by plates 30 each fixed to the heads 29 of two adjacent long teeth 14, said plates 30 extending tangentially from one of the heads to the other to press radially outwards against the exposed surfaces of the winding bars 12 disposed between these two long teeth.

The plates 30 are radially fixed and wedged by tapering pins 32 which are tangentially inserted and engage in holes 34 in the heads of the long teeth 14.

The internal constitution of the teeth, which is the same for the long teeth 14 and for the short teeth 16, will now be described.

In accordance with the present invention each of these teeth has:

a core 40 which extends along the whole length of the tooth, with a trapezium-shaped part of the core being disposed inside the foot 18 of the tooth and having a base surface 42 parallel to and opposite the middle of the large base of the foot 18, and two sloping side surfaces or flanks 44 which join the basis and which extend towards the body 20 of the tooth from the side edges of the base surface 42, these side surfaces sloping towards each other up to a point where the core 40 widens out to extend along the body portion 20 of the tooth; and a covering 46 applied to the core, said covering having a substantially constant thickness and forming at least the large base and the two sides of the foot 18 and the side walls of the body 20 and read 29 of the tooth, this covering being constituted by superposing layers of sheathing fabric which are disposed simultaneously parallel to the longitudinal direction and, in a cross-section of a plane which is perpendicular to this direction, along the surfaces of the teeth and being completely wrapped about the foot, body and the head of the core, these layers being impregnated with a hard resin so that the foot 18 of the tooth has high resistance to radially inward traction forces and so that the tooth as a whole has high resistance to bending forces about longitudinal axes.

Rectilinear inserts 48 are disposed longitudinally between two layers of fabric of the covering 46 in each of the two base angles formed at the two side edges of the large base of the foot 18 so that these angles are not excessively rounded.

The core 40 which extends not only in the foot 18 but also in the body of each tooth 14 has a neck in the tangential direction in the neighbourhood of the small base of the foot 18 of the tooth.

More precisely, for the manufacture of teeth that are about 15 to 20 cm in total height (measured radially), the following dispositions are adopted:

The core is made of stratified glass mat and epoxy resin. It is obtained directly by moulding or by machining. Sufficient layers of glass fabric necessary to obtain a simple thickness of 8 mm are then wound on the core. The glass fabric used has an average weight of about 250 g/m². It is wound in the direction of the warp of the fabric, leaving sufficient slack to allow it to be subsequently thrust with ease into the concave sides of the core, i.e. at the join between the foot and the body of the tooth, despite its lack of elasticity. This fabric is suitably treated with a liquid which promotes subsequent proper mechanical adhesion to the impregnating resin. Such a liquid or adhesive primer is recommended by most suppliers of resin for impregnating.

The rough thus prepared is placed in a machined mould shaped like the final profile of the tooth and then the whole is impregnated with an epoxy resin and polymerized hot.

Figure 6:
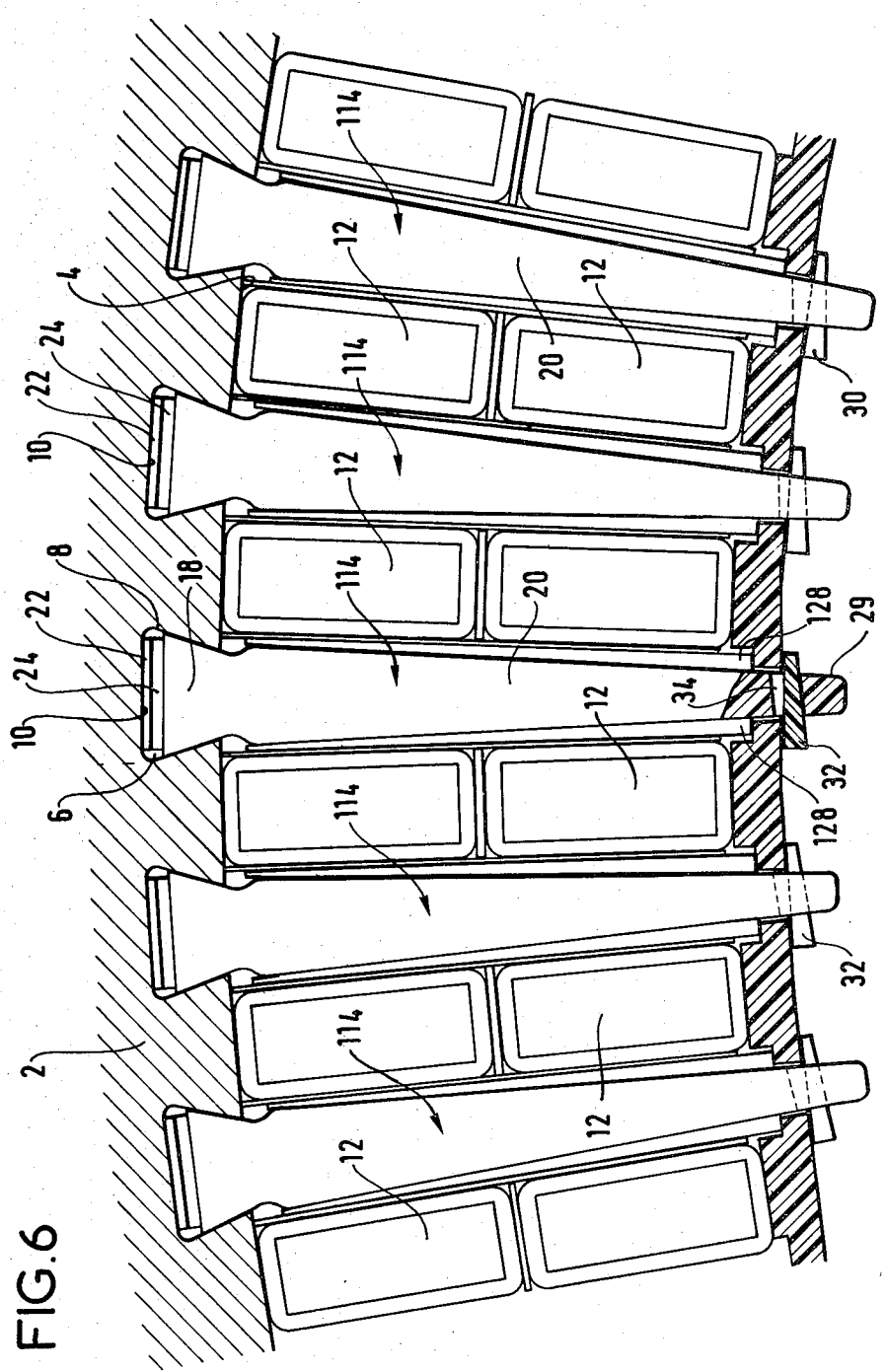
FIG. 6 is a cross-section through a variant long tooth which may be used instead of the tooth shown in FIG. 4.

It must be understood that the internal constitution of the teeth makes it possible to obtain the advantages of the present invention, namely, high mechanical strength, no electric losses and compactness, no matter how the winding bars are fixed to the bodies of these teeth. For example, without going beyond the scope of the present invention, it is possible to use, in accordance with FIG. 6, only long teeth 114 whose profile is thinned to allow the insertion of wedges 128 for tangentially blocking the tooth then being formed by simple superposition the sides of these teeth relative to the bars 12, the rest of the tooth being according to the above description.

We claim:

1. Dovetailed teeth for use in fixing stator winding bars of an electric rotating machine having a rotor that rotates about a longitudinal axis inside a stator, the stator having a magnetic circuit with a cylindrical inner surface disposed around the rotor and carrying angularly spaced winding bars that extend longitudinally and fixed against said cylindrical inner surface by means of said dovetailed teeth which are fixed to said magnetic circuit, said teeth protruding radially inwards and being spaced out angularly, each of said teeth being generally prismatic with longitudinal generatrices and comprising: a foot defining a trapezium in cross-section having a large base and a small base both disposed in the tangential direction with the small base nearest the inside of the machine, two flanks connecting said bases together; and a body which extends in the radial direction from the small base of said trapezium and terminating in a head; the teeth being fixed by engaging their feet in longitudinal slots of a trapezoidal cross-section which corresponds to that of said feet, said slots being formed in the inner surface of said stator magnetic circuit; the winding bars being fixed to the stator magnetic circuit by means of the bodies of these teeth which extend radially inwards from the inner surface of the stator magnetic circuit; the improvement wherein each of said dovetailed teeth includes:

a core which extends along the whole length of the tooth with parts within the foot, body and head thereof, a covering for said core parts of said core being disposed inside said foot of said tooth having a base surface which is parallel to and which faces a middle portion of the large base of the foot and two flank surfaces which extend towards the body of the tooth from the side edges of said base surface and coming progressively closer to each other; and said covering being applied to said core, the thickness of said covering being substantially constant, said covering being constituted by superposed layers of a sheathing fabric disposed parallel to the longitudinal direction completely wrapped about said core foot, body and head following the side surfaces of the tooth, said layers being impregnated with a hard resin so that the covering runs along the foot, body and head in order to transmit radial traction forces from said body and head to said foot; whereby the foot has high resistance to radial inward traction forces.

2. The teeth according to claim 1, for contact with radial blocking wedges which are driven longitudinally into the slot in which each of said teeth is engaged and which are disposed against the large base of the foot so as to be inserted between this large base and the end of said slot, thereby pushing the foot radially inwardly and thus permanently compressing the foot tangentially by pressure on the side surfaces of said slot.

3. The teeth according to claim 1, wherein rectilinear inserts are disposed longitudinally in each of said teeth between two layers of fabric of the covering in each of the two dihedron angles formed at the two side edges of the large base of the foot so as to prevent said two angles from being excessively rounded.

4. The teeth according to claim 2, wherein a gap is provided between two teeth which succeed each other longitudinally with their feet engaged in the same longitudinal slot, so as to allow said radial blocking wedges to be driven in without removing the teeth.

5. The teeth according to claim 1, wherein said sheathing fabric is a glass fabric wound in the direction of the warp of the fabric.

6. The teeth according to claim 1, wherein the core is constituted by a glass mat impregnated with hardened resin.

* * * * *